(12) United States Patent
Burgbacher

(10) Patent No.: US 7,247,962 B2
(45) Date of Patent: Jul. 24, 2007

(54) STATOR ASSEMBLY

(75) Inventor: Martin Burgbacher, St. Georgen (DE)

(73) Assignee: ebm-Papst St. Georgen GmbH & Co. KG, St. Georgen (DE)

(*) Notice: Subject to any disclaimer, the term of this patent is extended or adjusted under 35 U.S.C. 154(b) by 104 days.

(21) Appl. No.: 10/501,109

(22) PCT Filed: Dec. 6, 2002

(86) PCT No.: PCT/EP02/13821

§ 371 (c)(1),
(2), (4) Date: Jul. 8, 2004

(87) PCT Pub. No.: WO03/063322

PCT Pub. Date: Jul. 31, 2003

(65) Prior Publication Data
US 2005/0082931 A1 Apr. 21, 2005

(30) Foreign Application Priority Data
Jan. 22, 2002 (DE) .................... 202 00 873

(51) Int. Cl.
*H02K 7/02* (2006.01)
(52) U.S. Cl. .................... 310/71; 310/184
(58) Field of Classification Search .......... 310/71, 310/179, 180, 184, 185, 195, 198
See application file for complete search history.

(56) References Cited

U.S. PATENT DOCUMENTS

| | | | |
|---|---|---|---|
| 4,287,446 A | 9/1981 | Lill | 310/71 |
| 5,382,853 A * | 1/1995 | von der Heide et al. | 310/67 R |
| 5,457,366 A | 10/1995 | Wehberg | 318/439 |
| 5,828,147 A | 10/1998 | Best | 310/71 |
| 6,177,741 B1 | 1/2001 | Lütkenhaus | 310/71 |
| 6,472,783 B1 | 10/2002 | Witthohn | 310/68 R |

FOREIGN PATENT DOCUMENTS

| | | |
|---|---|---|
| DE | 41 22 529 | 1/1993 |
| DE | 195 44 830 | 6/1997 |
| DE | 199 24 325 A1 | 12/1999 |

(Continued)

*Primary Examiner*—Dang Le
(74) *Attorney, Agent, or Firm*—Milton Oliver, Esq.; Ware Fressola; Van Der Sluys and Adolphson LLP

(57) ABSTRACT

A stator assembly (20) has a plurality of splayed stator poles (31-36). A first winding coil (51) is arranged on the first stator pole (31) between a first current rail (38) and the second current rail (40), the second winding coil (52) is arranged on the second stator pole (32) between the second current rail (40) rails and the third current rail (42), the third winding coil (53) is arranged on the third stator pole (33) between the third current rail (42) and the first current rail (38), the fourth winding coil (54) is arranged on the fourth stator pole (34) between the first current rail (38) and the second current rail (40), the fifth winding coil (55) is arranged on the fifth stator pole (35) between the second current rail (40) and the third current rail (42), and the sixth winding coil (56) is arranged on the sixth stator pole (36) between the third current rail (42) and the first current rail (38).

9 Claims, 2 Drawing Sheets

FOREIGN PATENT DOCUMENTS

Figure 3:
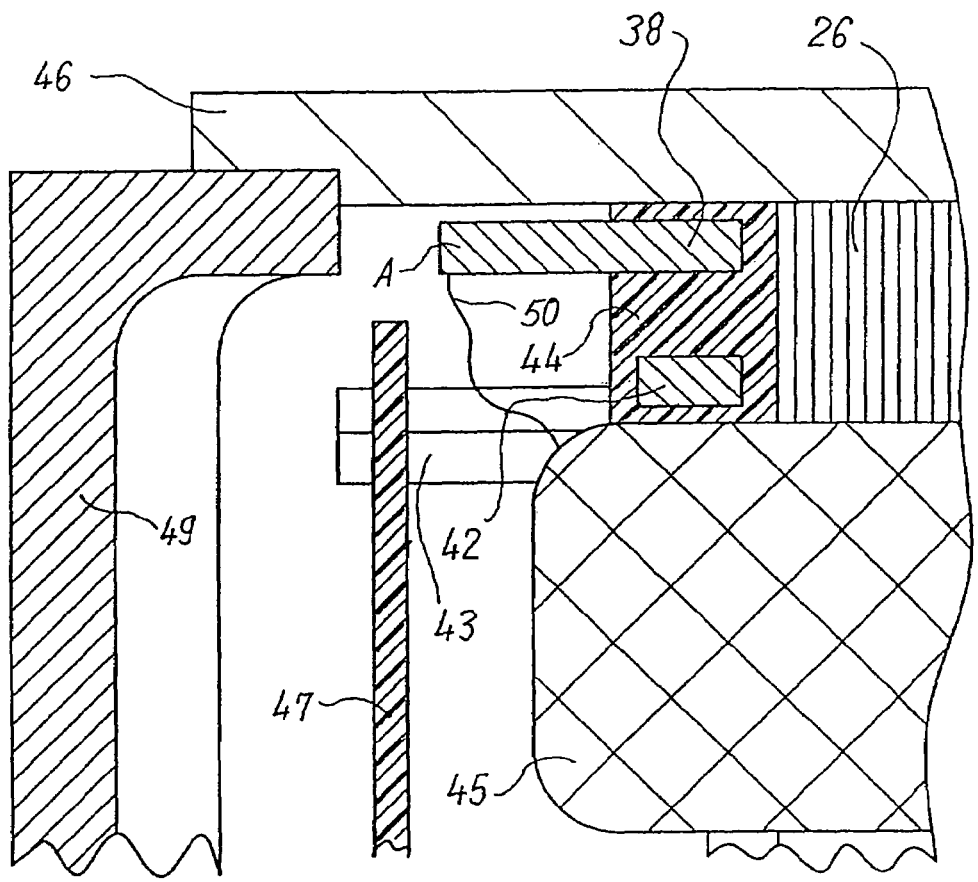

| | | |
|---|---|---|
| DE | 195 50 818 | 5/2000 |
| EP | 0 777 312 | 6/1997 |
| EP | 1 040 550 A1 | 10/2000 |
| EP | 1 111 757 A | 6/2001 |
| WO | WO 99-033 157 | 7/1999 |
| WO | WO 00/48292 | 8/2000 |

* cited by examiner

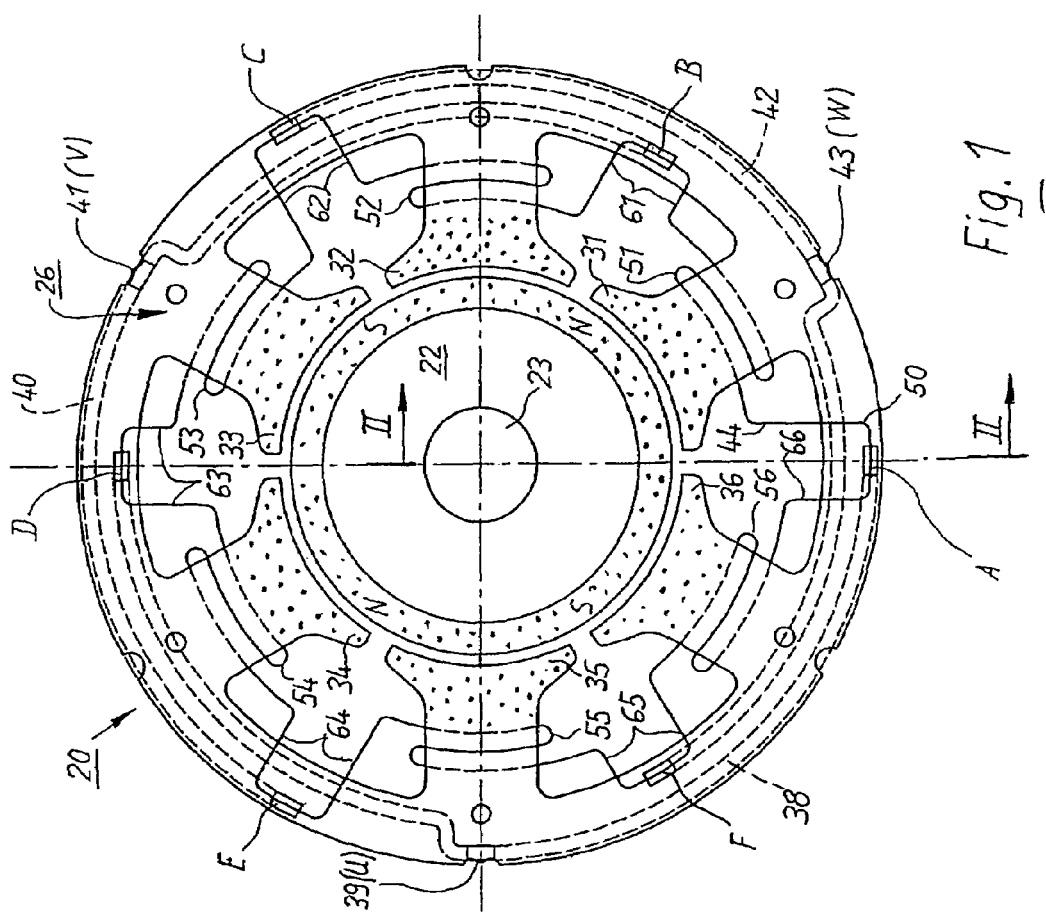
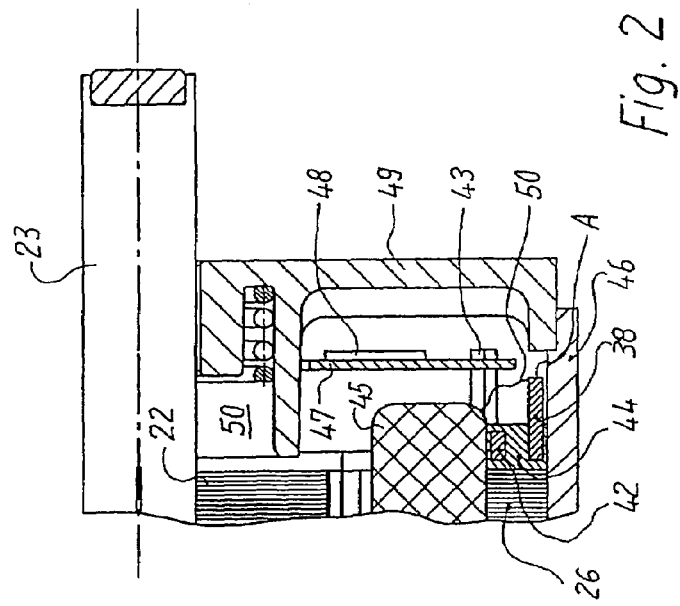
Fig. 1
Fig. 2

STATOR ASSEMBLY

This application is a § 371 of PCT/EP02/13821, filed Dec. 6, 2002, claiming priority from DE 202 02 873.8, filed Jan. 22, 2002, the entire disclosure of which is incorporated by reference.

FIELD OF THE INVENTION

The invention relates to a stator assembly, in particular for an electronically commutated motor.

BACKGROUND

In order to operate an electronically commutated motor with a low operating voltage, e.g. the battery voltage of a vehicle, at high rotation speed and with good efficiency, e.g. at 10,000 RPM or more, the resistance and inductance of the windings must be very low, and this means that a winding coil should have relatively few turns made of a thick wire, so that the stator slots can be well filled with copper wire.

If stators are automatically wound using so-called "needle winding machines," it is in many cases not possible to vary the wire gauge of a winding coil, so that one winds multiple wires in parallel.

If one attempts to solve the problem by connecting identical windings in parallel, this results, for a three-phase motor, in four wires, which must be coupled to a terminal (U, V, W) of the stator winding. Thus arises the necessity for time-consuming, expensive manual work.

SUMMARY OF THE INVENTION

It is therefore an object of the invention to provide a new stator assembly.

In accordance with the invention, this object is achieved by the subject matter of claim 1. Through the invention, one achieves that, during winding, the connection between adjacent winding coils need not be interrupted; rather, these coils can remain connected via wire contact terminals. These wire contact terminals are, preferably during the winding process, so electrically secured to an associated current rail, that these current rails can serve as a terminal for the supply of electrical current to the stator winding. It is very advantageous that this enables automatic manufacture of the stator winding, since often the electrical connection with the current rails can also be automated and since the winding wire no longer need be interrupted during winding, but rather if necessary can be continuously wound from the first winding coil through to the last winding coil.

The current rails, and possibly also the wire contact terminals between the winding coil can be contained, e.g. at a front face of the stator arrangement, in one or more correspondingly formed insulating parts, so that contact between wires of different winding phases and of different winding coils is reliably avoided. Short circuits in the region of the winding are made impossible, which assures high electrical safety, a state which is absolutely necessary, e.g. on ships, planes or land vehicles.

Due to the subject matter of claim 1, one thus achieves, in a very simple manner, a stator assembly whose three-phase winding is connected in a delta configuration, each phase comprising a plurality of parallel connected winding coils, continuously would and connected to each other at their ends by current rails. These current rails can also serve to transport electrical energy to or from the stator assembly. These rails are preferably provided with solder terminals or the like, which project directly into an adjacent circuit board and there are connected to the end stage transistors of the electronically commutated motor. Even in the case of high currents, it is possibly to sharply reduce losses in the conducting leads, i.e. the invention makes high operating efficiency possible.

Further details and advantageous refinements of the invention are apparent from the preferred embodiment described below and shown in the drawings, which is not to be construed as any limitation of the invention.

BRIEF FIGURE DESCRIPTION

Figure 4:
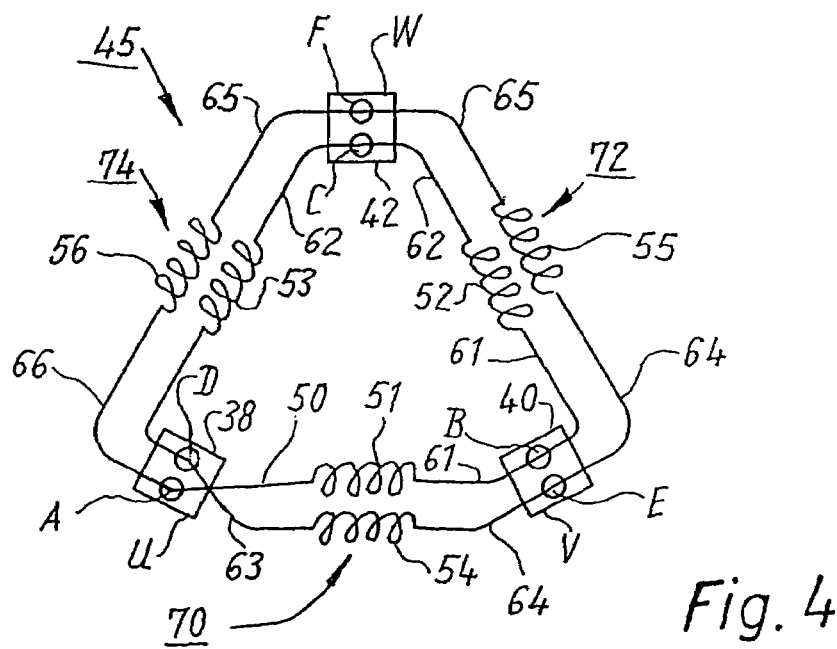

FIG. 1: a schematic drawing of a winding arrangement according to a preferred embodiment of the invention;

FIG. 2: a section, looking along line II-II of FIG. 1;

FIG. 3: an enlarged detail of FIG. 2, for better illustration of insulator 44 with copper rails 38 and 42; and FIG. 4: a circuit schematic for explanation of FIG. 1.

DETAILED DESCRIPTION

FIG. 1 shows the usual schematic illustration of a stator assembly 20, here representing the stator of an electronically commutated internal rotor motor, whose four-pole permanent-magnet rotor 22 and whose shaft 23 are schematically indicated. The invention is also suitable for use, e.g. in similar fashion, for a linear motor.

Stator assembly 20 has a standard lamination stack 26 wherein, within an angular range of 360°, six splayed poles 31, 32, 33, 34, 35 & 36 are provided. On an outer face of stator assembly 20, there are a U-copper rail 38 with a connection terminal 39, a V-copper rail 40 with a connection terminal 41, and a W-copper rail 42 with a connection terminal 43. These rails each extend through an arc of about 180° and are arranged on the facade of stator assembly 20 in an insulating annular part 44, shown in section in FIG. 2 and 3. This part is, according to FIGS. 2 & 3, arranged between the winding head of a schematically indicated stator winding 45 and the housing 46 of the motor. Since copper rails 38, 40, 42 each extend over 180°, at each point of the circumference, only two overlapping copper rails are present, e.g. at the 12 o'clock position of FIG. 1, the rails 40 (outer) and 38 (inner). Each rail extends over about 90° radially outside and over about 90° radially inside, as shown in FIG. 1.

Describing in terms of a clock face, the U-copper rail 38 extends approximately from 6 o'clock to 12 o'clock. The V-copper rail 40 extends from about 10 o'clock to 16 o'clock (4 PM). The W-copper rail 42 extends from about 2 o'clock to 8 o'clock. These copper rails are insulated from each other by the insulator 44. Their contact terminals 39, 41, 43 serve for electrical connection with a circuit board 47 (FIGS. 2 & 3), on which are arranged the power transistors 48 for control of the currents in the stator winding 45. In this manner, one achieves extremely short supply leads and thus low power losses in these leads. An end shield or bell is designated 49 and 50 designates a bearing for shaft 23.

On the stator poles are identical winding coils whose consistent winding direction is shown in FIG. 1. On the first stator pole 31 is a first winding coil 51. One begins with winding of this coil, after the starting end 50 of winding wire 44 is fastened at a point A (6 o'clock) to the U-rail 38. Point A is shown in FIGS. 2 & 3 in section and one recognizes that, at this position, the contact terminal A of copper rail 38 extends out of insulator 44 and this terminal A is connected to wire end 50, e.g. by welding. The subsequently described terminals B through F are carried out in the same manner.

Copper rail 42, at the point of terminal A, is completely surrounded by insulator 44, so that a short circuit between rails 38 and 42 is not possible. The same is true, analogously, for the other rails; these are, in intervals between terminals, completely surrounded by insulator 44, and at the connecting points, only the terminal of a rail projects out of the insulator 44.

Appendant to coil 51, one winds the second winding coil 52 onto the second stator pole 32, then the third winding coil 53 onto the third stator pole 33, then the fourth winding coil 54 onto the fourth stator pole 34, then the fifth winding coil 55 onto the fifth stator pole 35 and, finally, the sixth winding coil 56 onto the sixth stator pole 36.

There is thus created, between coils 51 and 52, a first wire loop 61 which is electrically and mechanically connected at a point B (4 o'clock) to the V-rail 40, preferably without interrupting the winding wire 44.

Between coils 52 and 53, there is created a second wire loop 62 which is connected at a point C (2 o'clock) to the W-rail 42.

Between coils 53 and 54, there is created a third wire loop 63 which is connected at a point D (12 o'clock) to the U-rail 38 and thus connects the points A and D electrically to each other.

Between coils 54 and 55, there is created a fourth wire loop 64 which is connected at a point E (10 o'clock) to the V-rail 40 and thus connects the points B and E electrically to each other.

Between coils 55 and 56, there is created a fifth wire loop 65 which is connected at a point F (8 o'clock) to the W-rail 42 and thus connects the points C and F electrically to each other.

The free end of coil 56 is designated 66 and is connected at point A to the U-rail 38 and the wire start 50. This terminates the winding.

FIG. 4 shows that a delta winding configuration is formed having, in each phase, two winding coils connected in parallel, namely in phase 70, between contacts U and V, the coils 51 & 54, in phase 72, between contacts V and W, the coils 52 and 55, and in phase 74, between contacts W and U, the coils 53 and 56. From FIG. 4, it is also clearly evident that U-rail 38 connects contacts A and D, V-rail 40 connects the contacts B and E, and W-rail 42 connects the contacts C and F. One also recognizes in FIG. 4 the layout of wire loops 61 through 65, and of the wire start 50 and end 66.

Naturally, within the scope of the invention, many variations and modifications are possible. For example, the winding arrangement of the invention is adaptable in similar fashion for an external rotor motor, or for a linear motor. In connecting to six stator poles, the stator arrangement can be repeated arbitrarily often, a task which is straight-forward to those of ordinary skill in the electrical machinery arts.

What is claimed is:

1. A stator assembly having a plurality of stator poles (31-36), said plurality being divisible by six,
   a first (31), a second (32), a third (33), a fourth (34), a fifth (35) and a sixth (36) of said stator poles being arranged successively within a predetermined angular range;
   three winding phases (70, 72, 74) connected in a delta configuration;
   three respective current rails (U, V, W, 38, 40, 42) associated with respective ones of said winding phases for their connection;
   wherein
   a first winding coil (51) is arranged on said first stator pole (31) and electrically connected between a first one (38) of said current rails and a second one (40) of said current rails;
   a second winding coil (52) is arranged on said second stator pole (32) and electrically connected between said second current rail (40) of said current rails and a third one (42) of said current rails;
   a third winding coil (53) is arranged on said third stator pole (33) and electrically connected between said third current rail (42) and said first current rail (38);
   a fourth winding coil (54) is arranged on said fourth stator pole (34) and electrically connected between said first current rail (38) and said second current rail (40);
   a fifth winding coil (55) is arranged on said fifth stator pole (35) and electrically connected between said second current rail (40) and said third current rail (42); and
   a sixth winding coil (56) is arranged on said sixth stator pole (36) and electrically connected between said third current rail (42) and said first current rail (38);
   wherein at least two successive winding coils (51, 52) are continuously wound and at their interface (61) are electrically connected to an associated current rail (40) without interrupting their winding wire (44).

2. The stator assembly of claim 1, wherein the winding coils of the first through sixth winding coils are continuously wound and are electrically connected at their respective interfaces (61-65) to respective current rails, without interrupting their winding wires.

3. The stator assembly according to claim 1, wherein at least one of said current rails (38, 40, 42) is configured to electrically interconnect a plurality of interface points (61, 64), said interface points being separated by three intervening stator poles.

4. The stator assembly according to claim 1, wherein there are three stator poles per pole pair of the rotor (22).

5. The stator assembly according to claim 4, wherein a terminal (U, V, W) is electrically connected with a circuit board (47) which is arranged adjacent an outer face of the stator assembly (20).

6. The stator assembly according to claim 5, further comprising
   at least one power semiconductor (48) provided on said circuit board (47) for controlling current in a phase (70, 72, 74) of the stator winding phases (45).

7. The stator assembly according to claim 1, wherein said current rails (38, 40, 42) are embedded within an insulating body (44) and are, except for terminals (A-F, U, V, W) of said rails, substantially completely enclosed by said body.

8. The stator assembly according to claim 7, wherein, at a terminating point (A-F, U, V, W), a respective terminal (A, 43) projects out of the insulating body (44).

9. An electronically commutated DC motor having
   a stator assembly with a plurality of stator poles (31-36), said plurality being divisible by six,
   a first (31), a second (32), a third (33), a fourth (34), a fifth (35) and a sixth (36) of said stator poles being arranged successively within a predetermined angular range;
   three winding phases (70, 72, 74) connected in a delta configuration;
   three respective current rails (U, V, W, 38, 40, 42) associated with respective ones of said winding phases for their connection wherein
a first winding coil (51) is arranged on said first stator pole (31) and electrically connected between a first one (38) of said current rails and a second one (40) of said current rails;
a second winding coil (52) is arranged on said second stator pole (32) and electrically connected between said second current rail (40) of said current rails and a third one (42) of said current rails;
a third winding coil (53) is arranged on said third stator pole (33) and electrically connected between said third current rail (42) and said first current rail (38);
a fourth winding coil (54) is arranged on said fourth stator pole (34) and electrically connected between said first current rail (38) and said second current rail (40);
a fifth winding coil (55) is arranged on said fifth stator pole (35) and electrically connected between said second current rail (40) and said third current rail (42); and
a sixth winding coil (56) is arranged on said sixth stator pole (36) and electrically connected between said third current rail (42) and said first current rail (38);
wherein at least two successive winding coils (51, 52) are continuously wound and at their interface (61) are electrically connected to an associated current rail (40) without interrupting their winding wire (44); and
a permanent magnet rotor (22), wherein said stator assembly (20) has three stator poles for each pole pair of said rotor (22).

* * * * *